July 4, 1939.  R. N. CUNDALL ET AL  2,164,502
APPARATUS FOR CLOSING AND SEALING FILLED BAGS
Original Filed April 14, 1933   12 Sheets-Sheet 1
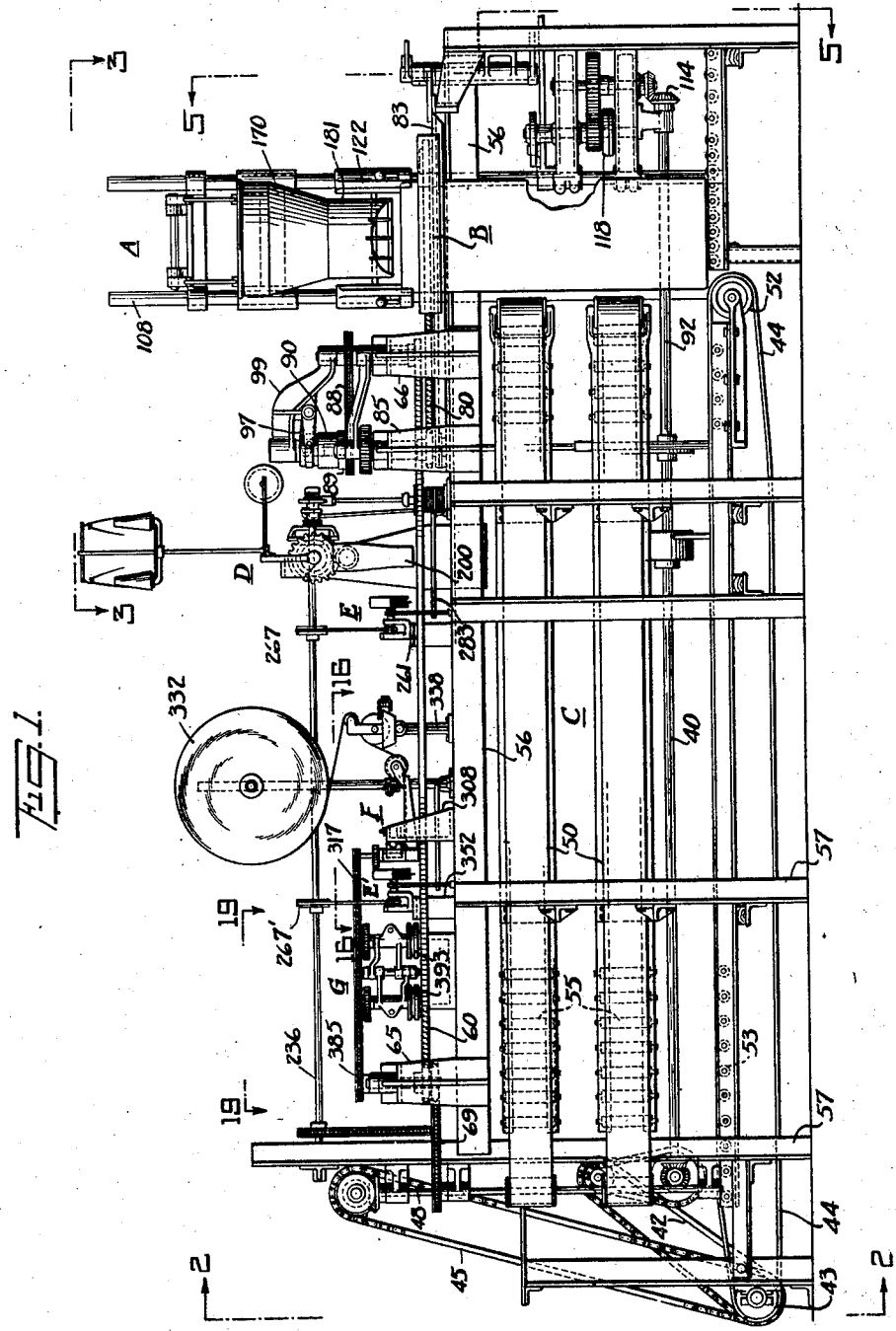
INVENTORS.
LINCOLN A. CUNDALL. AND
ROBERT M. CUNDALL. DECEASED.
LUTA L. CUNDALL. ADMINISTRATRIX.
By  Attorney

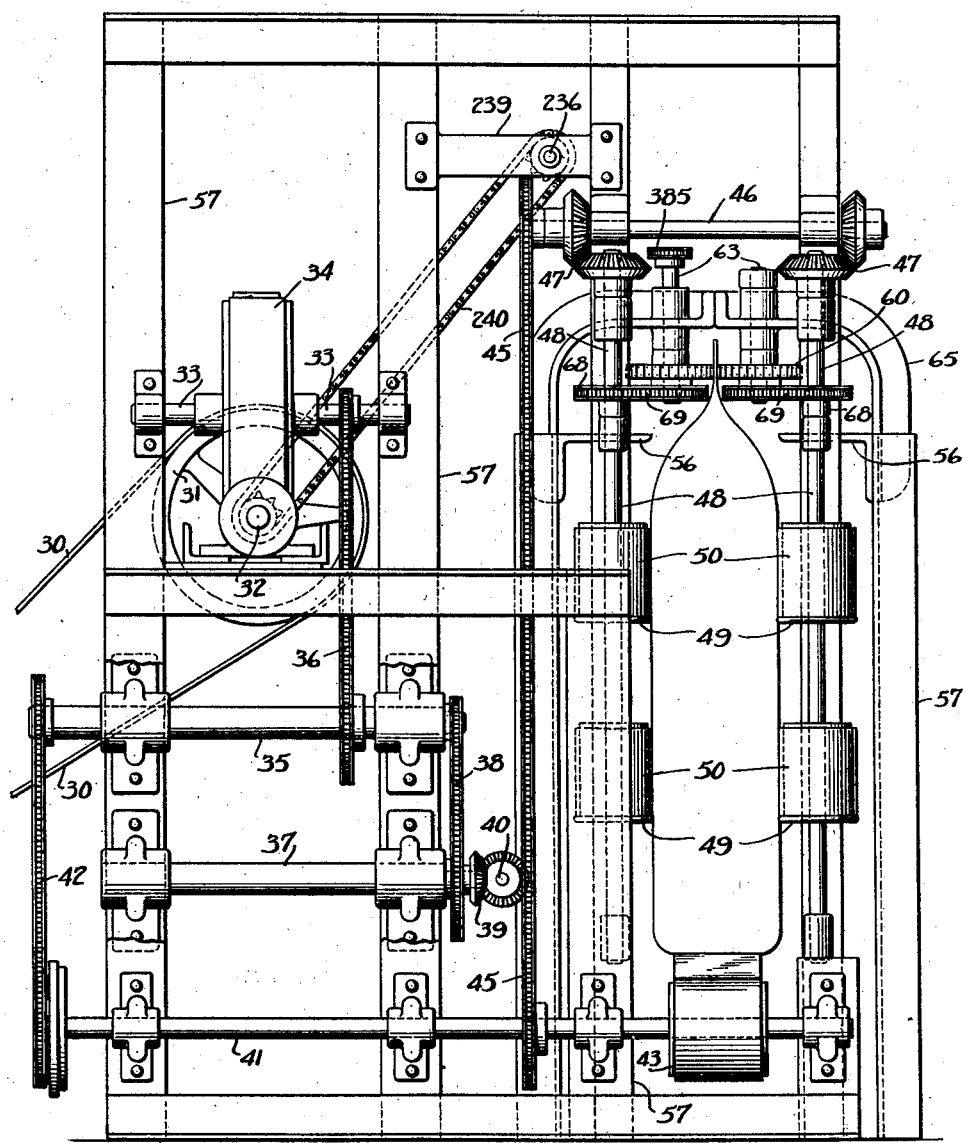

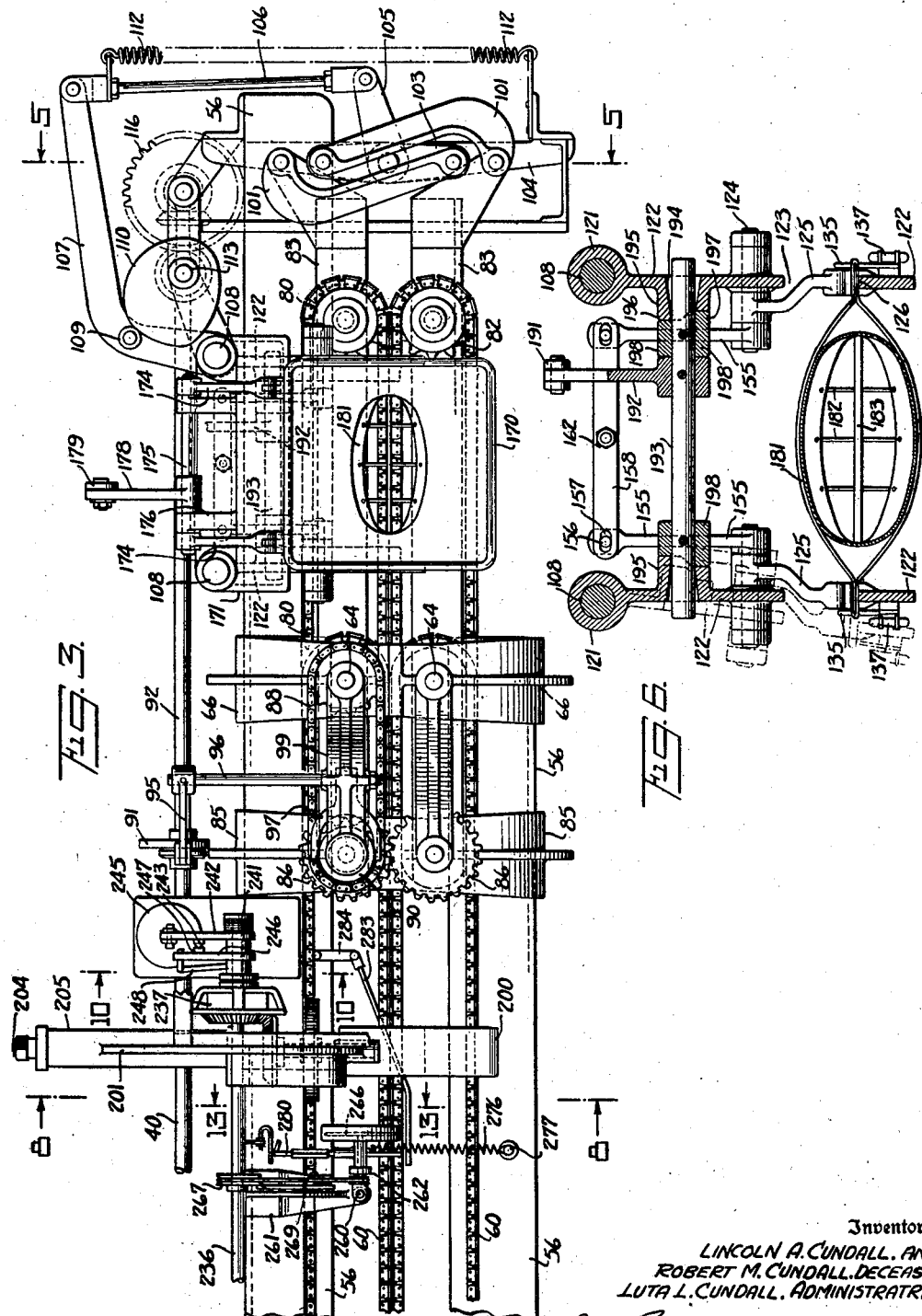

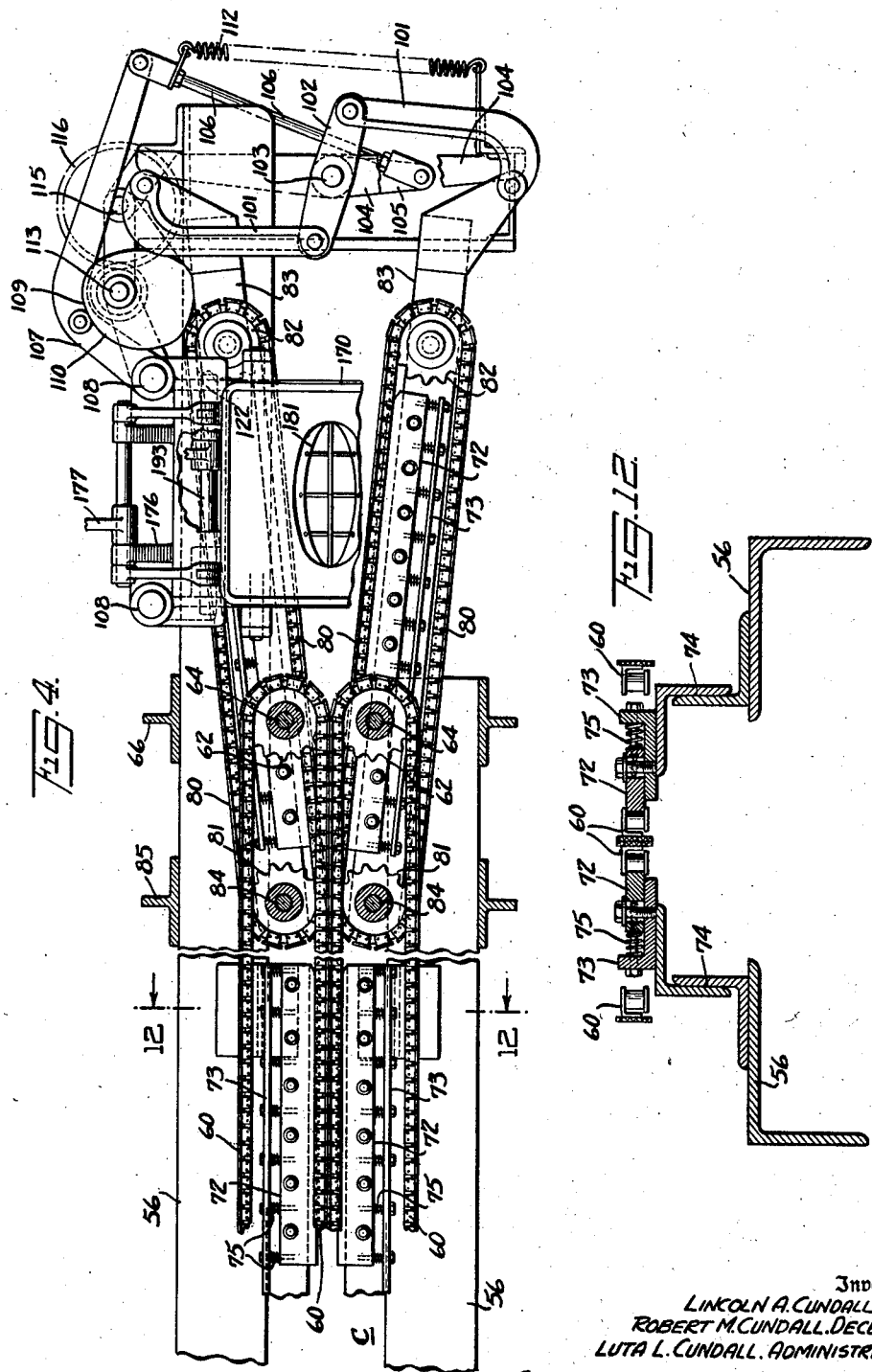

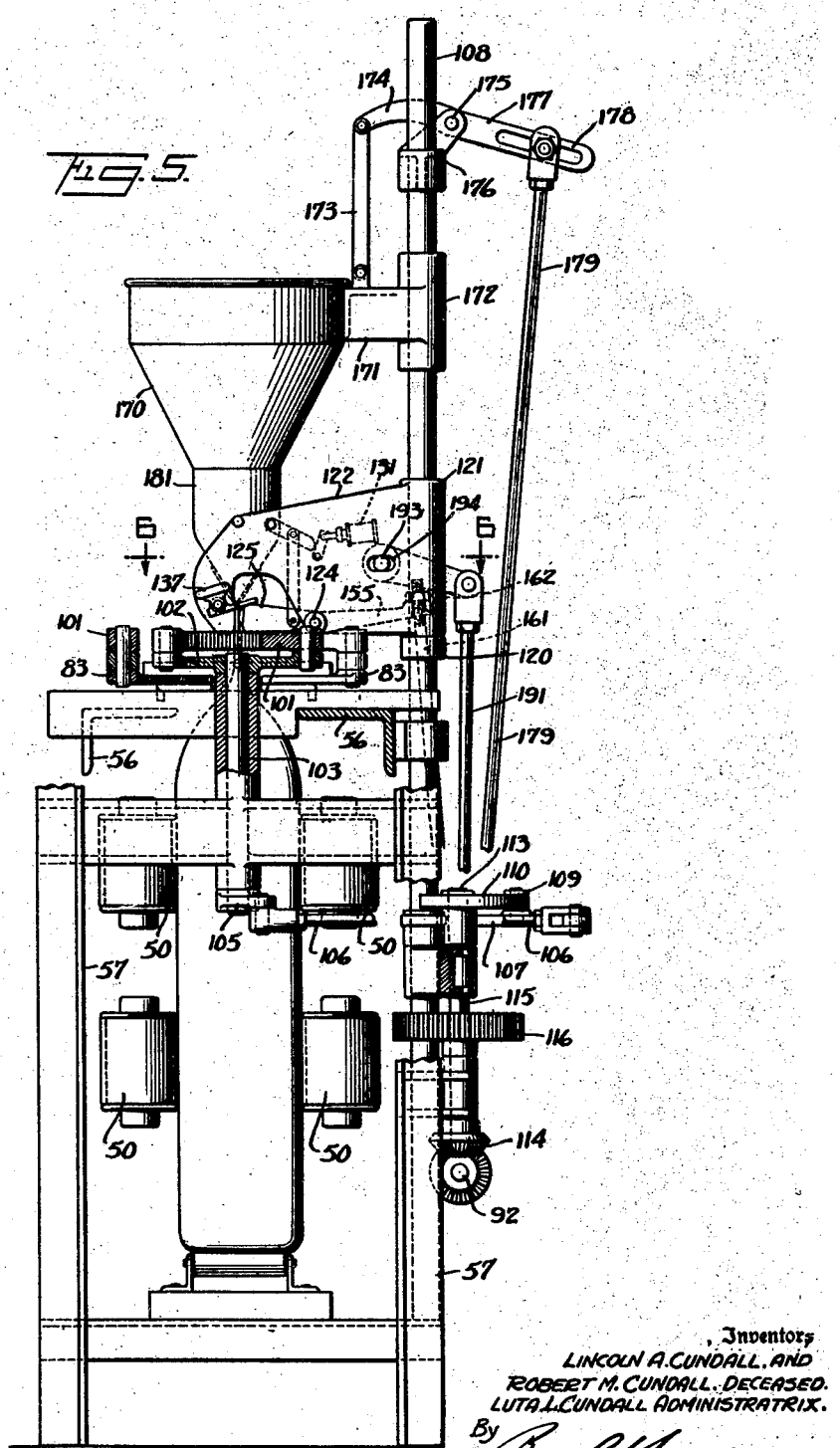

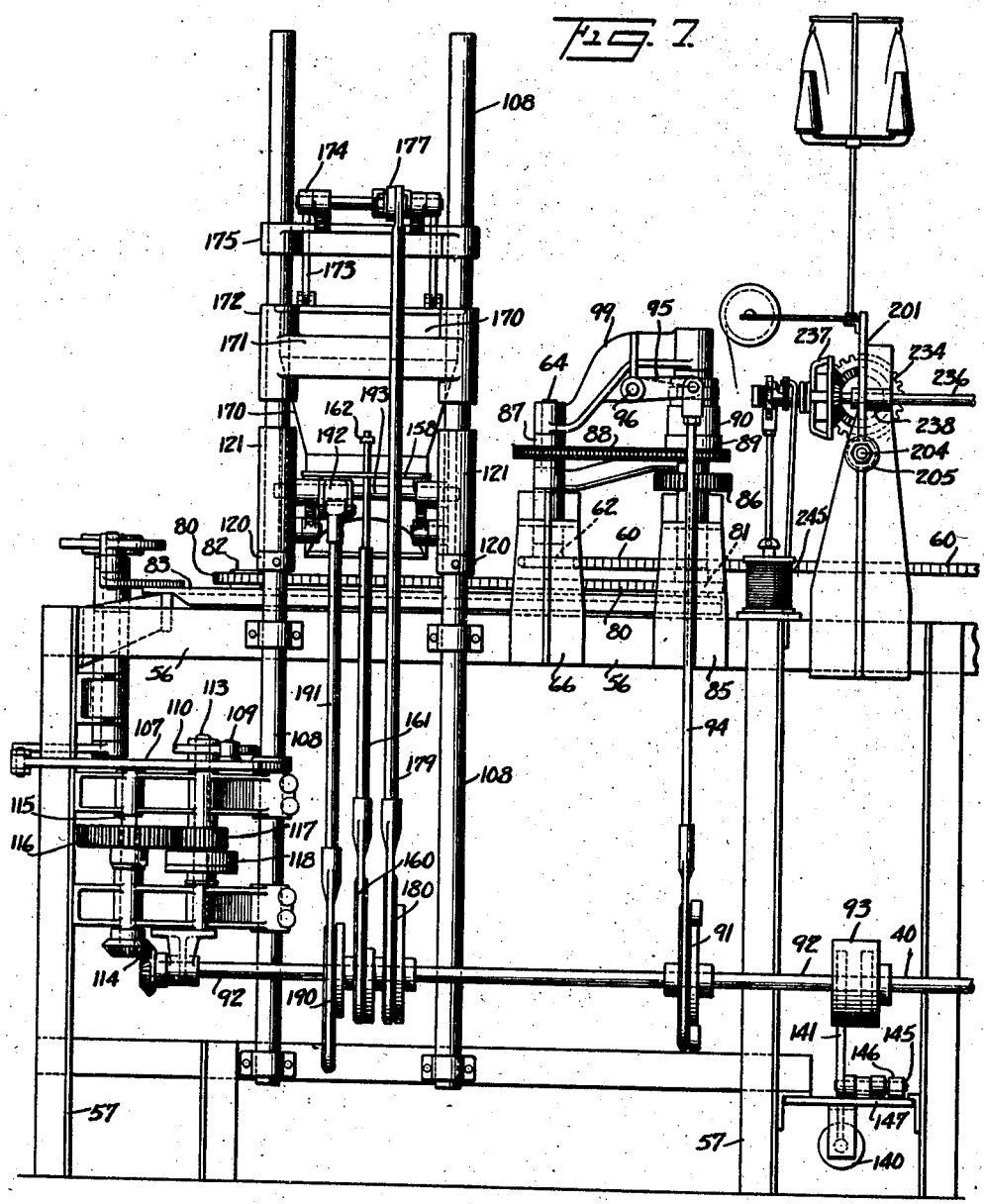

July 4, 1939.   R. N. CUNDALL ET AL   2,164,502
APPARATUS FOR CLOSING AND SEALING FILLED BAGS
Original Filed April 14, 1933   12 Sheets-Sheet 7
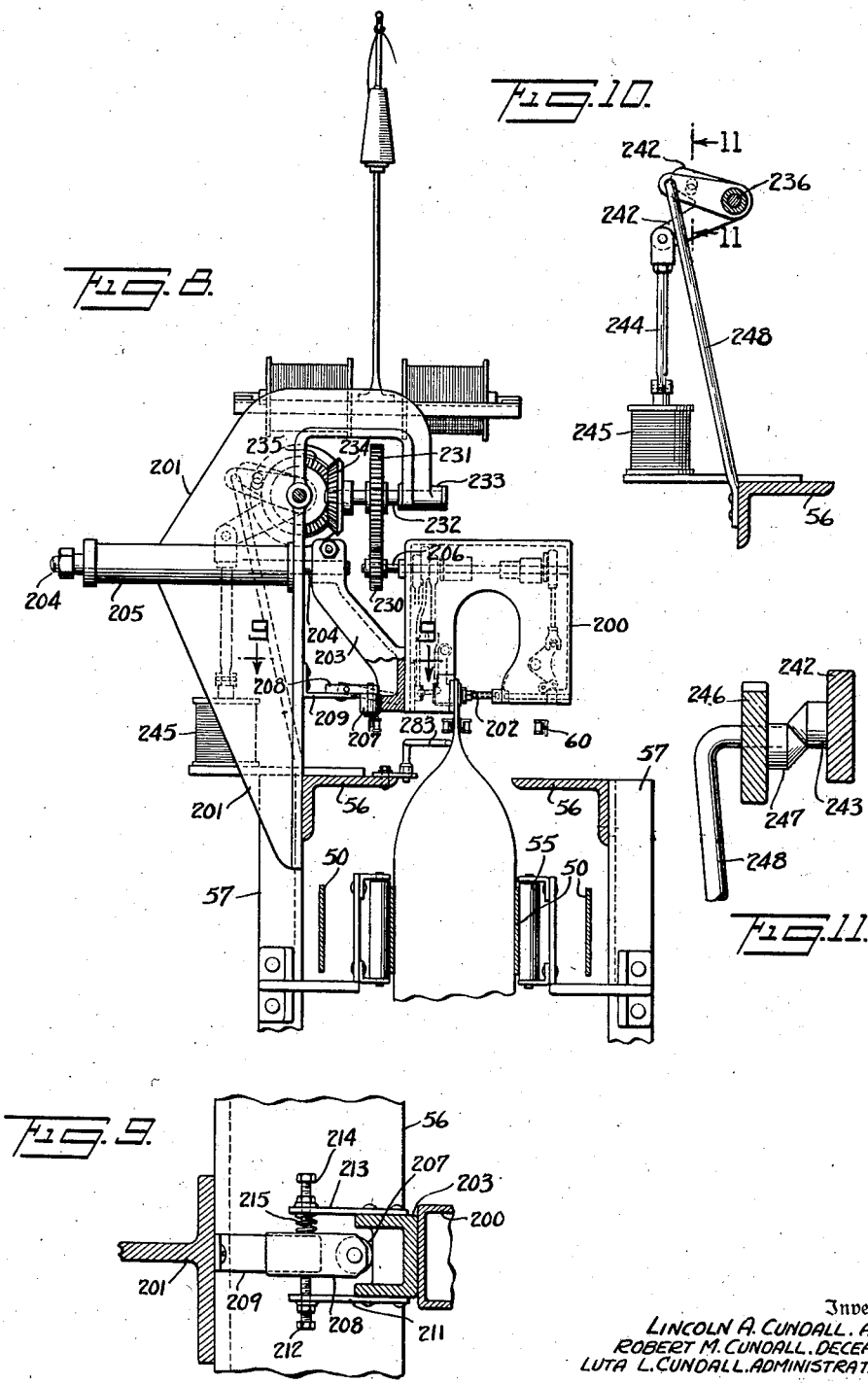

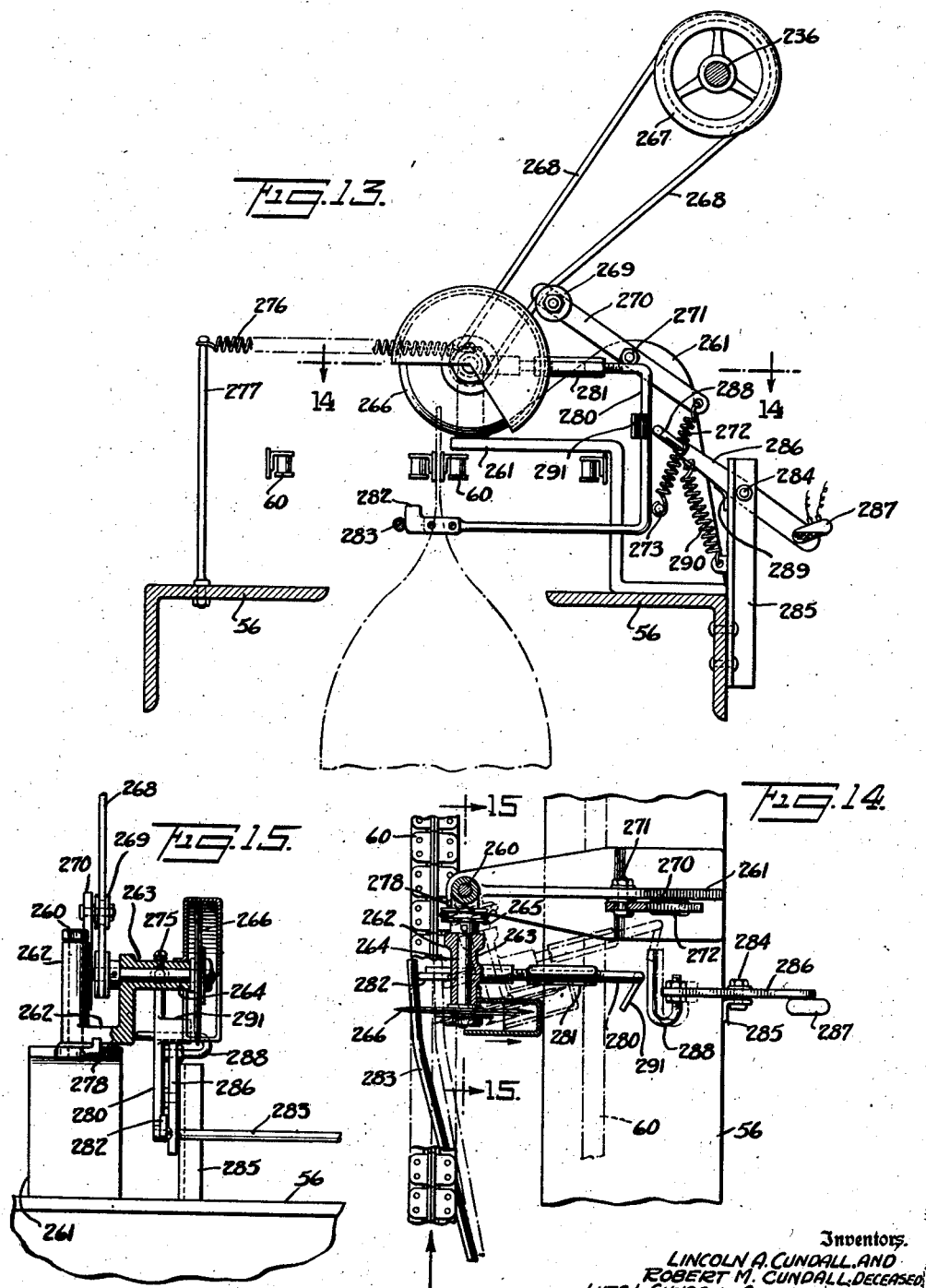

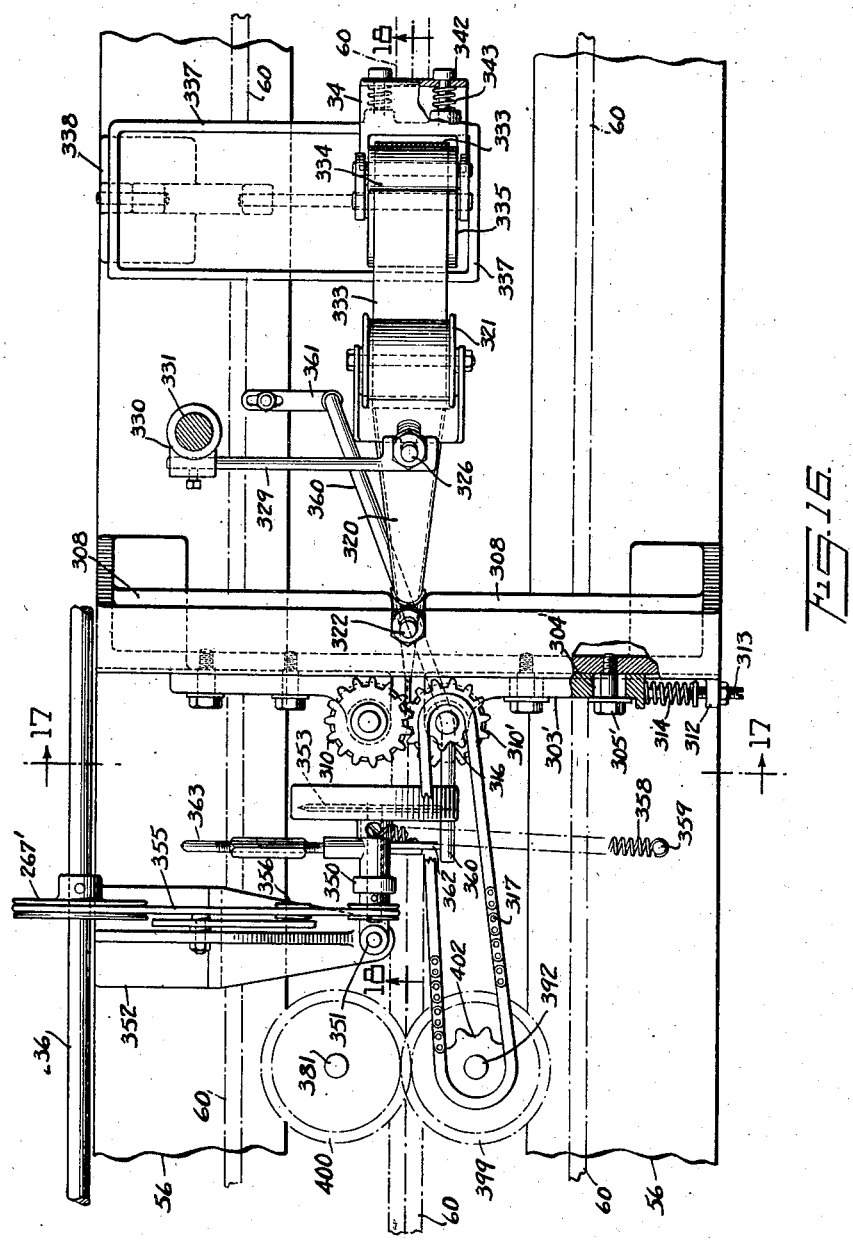

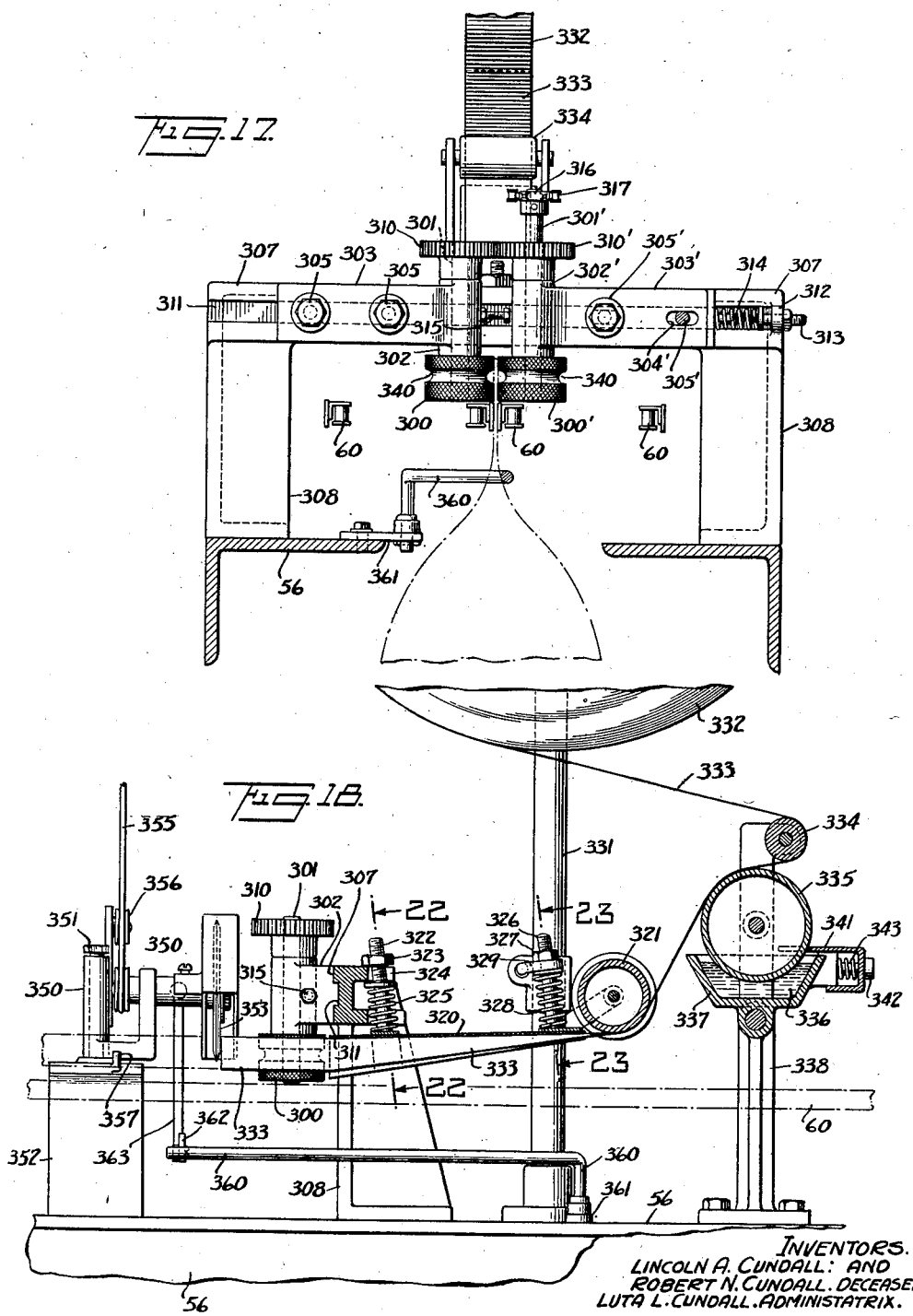

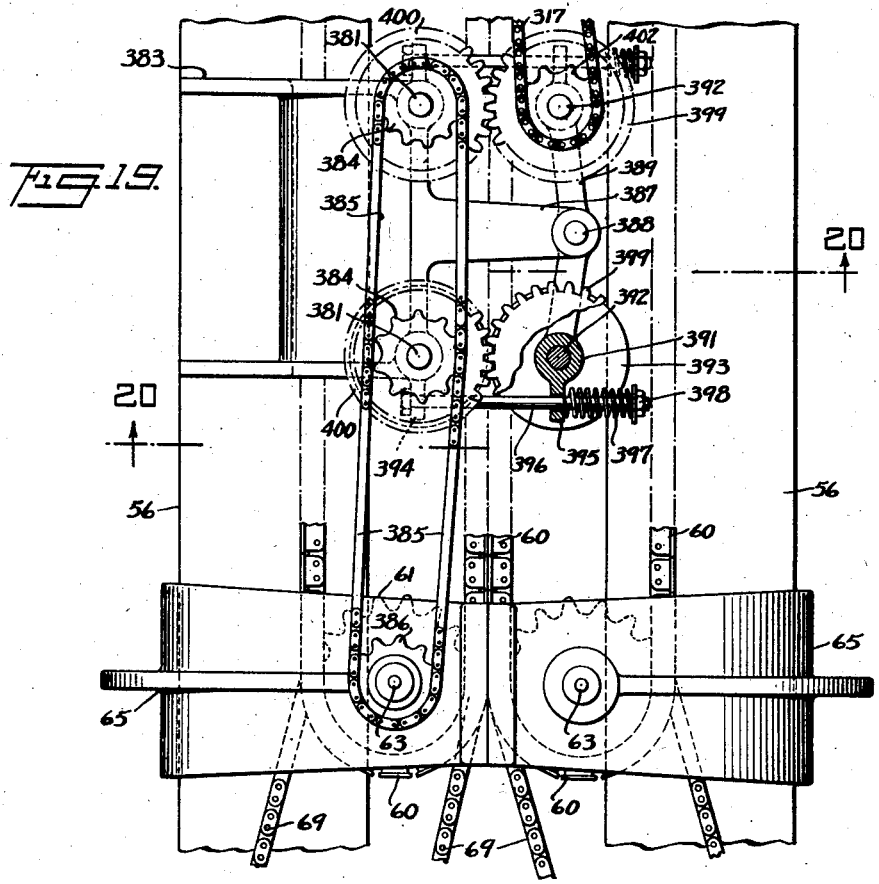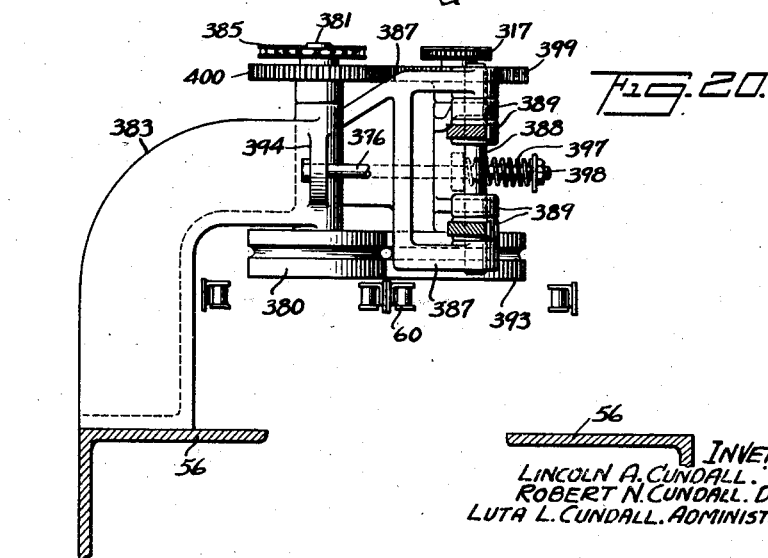

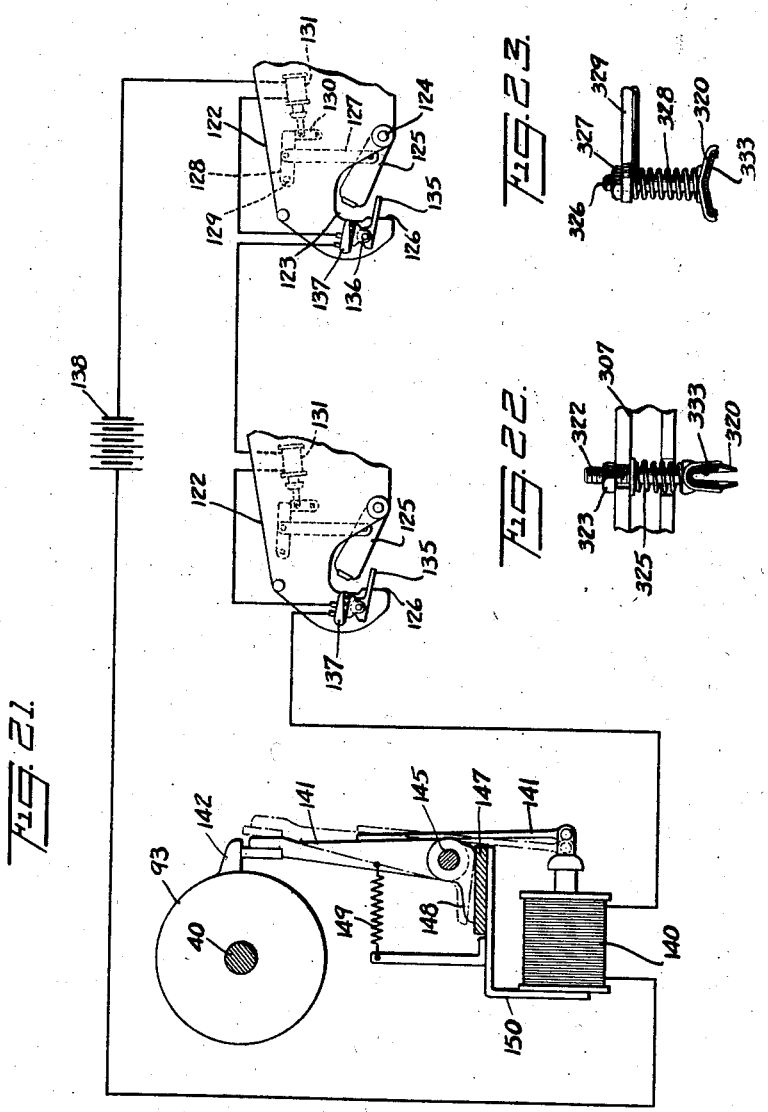

Patented July 4, 1939

2,164,502

UNITED STATES PATENT OFFICE 2,164,502

APPARATUS FOR CLOSING AND SEALING FILLED BAGS

Robert N. Cundall, deceased, late of Lackawanna, N. Y., by Luta L. Cundall, administratrix, Lackawanna, N. Y., and Lincoln A. Cundall, Rochester, N. Y., assignors to Bagpak, Inc., New York, N. Y., a corporation of Delaware Original application April 14, 1933, Serial No. 666,114. Divided and this application September 9, 1937, Serial No. 163,047

8 Claims. (Cl. 216—21)

The present application is a division of our copending application, Serial No. 666,114, filed April 14, 1933, and which has issued as Patent No. 2,097,447, dated November 2, 1937.

Our invention relates to apparatus for filling, sewing and sealing open-mouth bags, such, for example, as paper bags of relatively large size adapted to contain 100 lbs. or more of cement or other pulverulent or granular material.

In the copending application of Robert N. Cundall, Serial No. 640,758, filed November 2, 1932, it is pointed out that to accomplish the filling, sewing and sealing of large size open-mouth bags by hand requires excessive and tedious labor, and that prior to the invention set forth in the aforesaid copending application, there had been no satisfactory machine for accomplishing this purpose.

In the apparatus set forth in the aforesaid copending application, Serial No. 640,758, filed November 2, 1932, a series of bags to be filled are progressed through a plurality of stations by means of a conveying device operating intermittently. At various stations along the path of the bags, that is to say, at points where the bags are brought to rest by the conveyor, there are located devices for filling, closing, sewing and sealing the bags, as well as a device for severing the chain of stitches and tape by which the bags are joined as they approach the forward end of the apparatus.

Our present invention has for an object the provision of apparatus for filling, sewing and sealing bags, more especially paper bags adapted to contain large quantities of materials, which shall be simplified in various respects with respect to prior machines and which shall have numerous advantages in construction and operation, as will hereinafter be found to obtain.

Our invention has for further objects the provision of apparatus in which the progress of the bags may be made continuous and uniform rather than intermittent through at least a considerable portion of the apparatus, to allow for small differences in the time required for the operator to introduce the individual bags into the machine, the provision of means for gusseting of the bags prior to the filling and sewing thereof, thereby eliminating a separate bag-closing station, and the provision of means for automatic actuation of the various filling, sewing, taping and severing devices in accordance with the progress of the bags.

Our invention has for further objects such additional improvements and advantages in construction and detail and in operative results as may hereinafter be found to obtain.

Our invention contemplates the provision of filling means adapted to enter the mouth of a bag to deliver material into the bag and adapted to be withdrawn from the filled bag, in association with means for gripping the bag at the upper and outer (and, it may be gusseted) corners of the bag during the filling operation, said gripping or holding means being movable with respect to each other to permit expanding the mouth of the gripped bag to receive the filling means or spout and to permit drawing the mouth of the bag closed and taut after it has been filled.

When the bags are filled, they are caused to be progressed at a uniform rate past devices adapted to sew and seal the bag mouths and to sever the stitches and tape connecting the several bags, and these devices are caused to operate in accordance with the actual passage or positions of the bags passing along the conveyor.

Our invention further contemplates the provision of an intermittently and automatically operated device for transferring the filled bags into the grip of a continuous conveying device which carries the bags past the several devices for sewing the bag mouth, severing the stitches, applying adhesive tape over the sewed bag mouth and severing the tape.

Our invention also comprises the provision of means located in the path of the bags at a subsequent point for applying pressure to the sewed, taped and severed bags to insure adherence of the tape thereto.

Our invention further contemplates numerous improvements in the construction and operation of the various units forming parts of the complete mechanism, which improvements will be described more fully hereinbelow.

Certain features of the invention herein disclosed and claimed are likewise disclosed but not claimed in the copending application of Robert N. Cundall and Lincoln A. Cundall, Serial No. 680,538, filed July 15, 1933, Apparatus for closing bags, now Patent No. 2,097,448, dated November 2, 1937.

In order that our invention may clearly be set forth and understood, we now describe, with reference to the drawings accompanying and forming a part of this specification, a preferred form and manner in which our invention may be embodied and operated. In these drawings, Fig. 1 is a side-elevational view of a machine for filling, sewing and sealing open-mouth bags, constructed in accordance with our invention;

Fig. 2 is an end-elevational view of the apparatus shown in Fig. 1, taken on the line 2—2 of Fig. 1;

Fig. 3 is a plan view of a portion of the apparatus shown in Fig. 1, taken on the line 3—3 of Fig. 1;

Fig. 4 is a view similar to Fig. 3, but showing parts of the apparatus in a different position;

Fig. 5 is a view, partly in elevation and partly in vertical section, of the apparatus shown in Fig. 1, taken on the line 5—5 of Fig. 1;

Fig. 6 is a horizontal sectional view of a portion of the apparatus shown in the preceding figures, taken on the line 6—6 of Fig. 5;

Fig. 7 is a side elevational view of a portion of the apparatus shown in Fig. 1, viewed from the opposite side of the same;

Fig. 8 is a vertical sectional view of a portion of the apparatus shown in preceding figures, taken on the line 8—8 of Fig. 3;

Fig. 9 is a horizontal view of a portion of the apparatus shown in Figs. 3 and 8, taken on the line 9—9 of Fig. 8;

Fig. 10 is a vertical sectional view of a portion of the apparatus shown in Fig. 3, taken on the line 10—10 of Fig. 3;

Fig. 11 is a vertical sectional view of a portion of the apparatus shown in Fig. 10, taken on the line 11—11 of Fig. 10;

Fig. 12 is a vertical sectional view of a portion of the apparatus shown in Fig. 4, taken on the line 12—12 of Fig. 4;

Fig. 13 is a vertical sectional view of a portion of the apparatus shown in Figs. 1 and 3, taken on the line 13—13 of Fig. 3;

Fig. 14 is a horizontal sectional view of a portion of the apparatus shown in Fig. 13, taken on the line 14—14 of Fig. 13;

Fig. 15 is a vertical sectional view of a portion of the apparatus shown in Figs. 13 and 14, taken on the line 15—15 of Fig. 14;

Fig. 16 is a plan view of a portion of the apparatus shown in Fig. 1, taken on the line 16—16 of Fig. 1;

Figs. 17 and 18 are vertical sectional views of the apparatus shown in Fig. 16, taken on the lines 17—17 and 18—18, respectively, of Fig. 16;

Fig. 19 is a plan view of a portion of the apparatus shown in Fig. 1, taken on the line 19—19 of Fig. 1;

Fig. 20 is a vertical sectional view of the apparatus shown in Fig. 19, taken on the line 20—20 of Fig. 19;

Fig. 21 is a more or less diagrammatic view, partly in elevation, of portions of the apparatus shown in Figs. 1, 5 and 7 and illustrating electrical connections therefor; and Figs. 22 and 23 are sectional views of a portion of the apparatus shown in Figs. 16 and 18, taken on the lines 22—22 and 23—23, respectively, of Fig. 18.

Similar characters of reference designate the same or similar parts in each of the several views of the drawings.

*The apparatus as a whole*

The bags to be filled, sewed and sealed are introduced one at a time into the apparatus at a station A, where the bags are filled with a predetermined amount of material, the mouth of the bag being filled at each operation being firmly held by apparatus associated with the filling station A, and to be described in detail hereinbelow.

The mouth of the filled bag is then firmly gripped by an intermittently operated conveyor B and the bag is transferred to a continuously moving conveyor C to be sewed and sealed. As the bag passes along the conveyor C, the mouth of the bag passes in sequence past a sewing machine D, a shear E, a tape-applying device F, a second shear E', a tape-squeezing device G and out of the machine, the progress of the bag or bags being from right to left through the machine as viewed in Fig. 1.

Thus, each bag is first filled, then sewed, the stitching connecting the sewed bag to the sewing machine or the following bag is then severed, adhesive tape is applied over the sewed bag mouth, the following tape is then severed, and finally pressure is applied to the bag closure to insure adherence of the tape to the bag mouth.

The arrangement and construction of the machine is such that the bags are filled and transferred to the continuous conveyor C as fast as they are filled or at the will of the operator, and the mechanism for sewing and taping the bag, as well as the shears for cutting the stitching and the tape, are caused to be actuated by the bags themselves as they pass along the conveyor C, the exact spacing of the bags along the conveyor C being immaterial.

*Driving mechanism and conveyors*

A motor (not shown), through a belt 30 and a pulley 31, drives a high-speed shaft 32. The shaft 32 drives a shaft 33 through a speed reducer 34 while the shaft 33 drives a shaft 35 through a sprocket chain 36. The shaft 35 in turn drives a shaft 37 through a sprocket chain 38, which shaft 37 is connected by bevel gearing 39 to a shaft 40 extending lengthwise of the machine. The shaft 35 also drives a shaft 41 through a sprocket chain 42, which shaft 41 carries a pulley 43 over which passes a belt 44.

The shaft 41 through a sprocket chain 45 drives an overhead shaft 46 which is connected by bevel gearing 47 to a pair of vertical shafts 48 which shafts 48 may carry, as shown, a plurality of flanged pulleys 49 driving endless belts 50.

The other end of the belt 44 passes over a pulley 52, and the upper span of the belt 44 is supported upon a plurality of rollers 53, only a few of which have been shown in the drawings. Similarly, the belts 50 travel over the pulleys 49 and a corresponding number of pulleys 54, and the inner spans of the belts 50 are supported laterally by rollers 55. The belts 50 move in unison with the belt 44 and provide lateral support for the filled bags travelling on the belt 44, but may be omitted if desired.

The apparatus in general is supported upon a frame comprising principally two main angles 56 and vertical supporting members 57, together with suitable lateral supports and other structural members, the details of which do not require description.

The mouths of the bags passing along the conveyor C are gripped between a pair of belts or leather-faced chains 60 extending between pairs of sprockets 61 and 62 mounted on vertical shafts 63 and 64 that are supported upon supports 65 and 66, respectively, which supports are conveniently supported upon the main angles 56 of the supporting frame.

The chains 60 are driven from the shafts 48 through sprockets 68 mounted on the latter, chains 69 and sprockets 70 keyed to the shafts 63 which also carry the sprockets 61.

The inner lengths of the chains 60 are pressed together by plates 72 mounted upon angle members 73 which are in turn supported upon members 74 laid on the main frame angles 56. Each of the plates 72 is flexibly biased toward the inner length of the corresponding chain 60 by means of a plurality of compression springs 75. A suitable number of these biased plates 72 are provided along the length of the belts or chains 60 to provide sufficient pressure upon the belts or chains to firmly hold the mouths of the bags passing through the conveyor C. While two of these plates 72 are shown in Fig. 4, they have been removed in Figs. 1 and for the sake of clarity. Fig. 12, however, shows the details of the plates 72 and their mountings.

The intermittent conveyor B comprises a pair of endless belts or leather-faced chains 80 extending between pairs of sprockets 81 and 82 mounted on swinging members 83. The sprockets 81 are keyed to vertical shafts 84 mounted somewhat forward of the shafts 64 on a support 85 and are connected together by means of gears 86. The forward ends of the swinging members 83 are pivotally mounted on the shafts 84.

The chains 80 are driven from one of the shafts 64 through a sprocket 87, a chain 88, a sprocket 89 freely mounted on one of the shafts 84 and a clutch 90. The sprocket 89 drives the shafts 84 only when the clutch 90 is engaged, which occurs when a cam 91 on a shaft 92 driven through a one-revolution clutch 93 by the shaft 40 acts through a cam rod 94, to move a lever 95 which is keyed to a shaft 96 carrying a bifurcated clutch lever 97.

The upper ends of the shafts 64 and 84, which carry the sprockets 87 and 89, are journaled in the ends of a supporting member 99 which also serves to carry the shaft 96.

The rear ends of the swinging members 83 are pivotally connected by links 101 to the opposite ends of a swinging link 102 keyed to a vertical shaft 103 journaled in a member 104 attached to one of the main frame angles 56. Also keyed to the shaft 103 is a lever 105 pivotally connected by means of a rod 106 to a cam lever 107 pivotally mounted at the opposite end to one of a pair of vertical rods 108 and carrying a cam roller 109 adapted to bear against the face of a cam 110. A spring 112 is provided to hold the cam roller 109 against the cam 110.

The cam 110 is mounted on a vertical shaft 113 which is driven by the shaft 92 through bevel gears 114, a shaft 115, a gear 116, a gear 117 freely mounted on the shaft 113, and a one-revolution clutch 118. The number of teeth of the gear 116 is twice that of the gear 117, and the arrangement is such that during one-half revolution of the shaft 92 the shaft 113 and cam 110 are stationary, while during the next half-revolution of the shaft 92, the shaft 113 and cam 110 make one full revolution, swinging the chains 80 from their open position (as shown in Fig. 4) into their closed position (as shown in Fig. 3) and, after a short interval, back into the open position of Fig. 4.

The time allowed to elapse while the swinging chains 80 are in their closed position is sufficient to allow the chains 80 to carry a bag forward from the filling station A into the grip of the chains 60.

The purpose of the clutch 93 is to permit relatively rapid rotation of the cam 110, thereby shortening the time necessary to swing the chains 80, without requiring an impractically steep pitch on the surface of the cam 110. With the arrangement shown, a moderate pitch of the cam 110 effects a rapid swinging movement of the chains 80.

The cam 91 is so positioned and designed that the belts or chains 80 rotate only when they are in their closed position as shown in Fig. 3.

The chains 80 are provided with plates 72 and springs 75 similar to those provided for the chains 60.

Bag filling mechanism

It will be observed from inspection of Figs. 1, 3 and 4 that one of the angles 56 terminates at the standard 66 whereas the other angle 56 extends a considerable distance farther toward the rear, and that the vertical rods 108 are mounted on the longer angle 56 at points lying to the rear of the standard 66.

The bag filling mechanism A is mounted upon the rods 108, the space below and on one side of the same being unobstructed except by the swinging angles 83 and the chains 80 mounted thereon.

Pivotally mounted on the rods 108 and supported by collars 120 keyed to the latter are a pair of sleeves 121 having extension arms 122 provided with cutaway portions 123. Pivoted to each of the arms 122 at 124 is a gripping lever 125, the outer end surface of which is adapted to cooperate with a vertical surface 126 of the corresponding arm 122 lying directly above the intersection line of the chains 80 to grip an outer end of the mouth of a bag.

When no bag is inserted in the cutaway portions or mouths 123 of the arms 122, the gripping levers 125 are supported by means of links 127, levers 128 pivoted to the arms 122 at points 129 and pivoted latch members 130 operated by solenoids 131. As shown in Fig. 21, when the solenoids 131 are deenergized, the latch members 130 serve to uphold the levers 128 and the gripping levers 125.

Extending across the mouths 123 along the lines of intersection of the gripping levers 125 and the surfaces 126 are a pair of feelers 135, pivotally mounted on the arms 122 at points 136 and carrying mercury switches 137. As shown in Fig. 21, when no bag is inserted in the gripping mechanism, the feelers 135 occupy a substantially horizontal position across the mouths of the gripping arms 122 and the switches 137 are open. When, however, the end of the mouth of a bag is inserted in the mouth of one of the gripper arms 122, the free end of the corresponding feeler 135 is raised, tilting and closing the corresponding switch 137.

As shown in Fig. 21, the two switches 137 and the two solenoids 131 are all connected in series to a source 138 of electric current. Consequently, when both of the outer ends of a bag mouth have been inserted in the mouths 123 of the arms 122, the solenoids 131 are energized, and the levers 125 fall and grip the ends of the bag mouth against the surfaces 126.

At the same time, the electric current from the source 138 energizes a solenoid 140 also located in series with the switches 137, withdrawing the upper end of a lever 141 out of the path of a dog 142 on the clutch 93 and permitting the dog 142 and the shaft 92 to rotate with the shaft 40 for one revolution. At the end of one revolution of the shafts 92 and 40, the solenoid 140 will have been deenergized, as will be explained hereinbelow, and the upper end of the lever 141 will engage the dog 142, opening the clutch 93 and stopping the shaft 92.

The lever 141 is mounted upon a short shaft 145 journaled in bearings 146 mounted on a bracket 147 attached to two of the frame uprights 57, and has a stop 148 and a spring 149 which serves to bias it toward the position shown in full lines in Fig. 21. The solenoid 140 may conveniently be mounted, as shown, on a bracket 150 attached to the bracket 147.

Keyed to the shafts 124 are a pair of levers 155 having connecting pins 156 extending through slots 157 in a cross-bar 158. The shaft 92 is provided with a cam device 160 having a cam rod 161 passing through the bar 158 and terminating in an adjustable head 162. Once in every revolution of the shaft 92 the head 162 descends, lowering the levers 155 and raising the levers 125 to release the bag. As the head 162 rises again, the levers 125 are retained in their uppermost position by means of the latches 130.

The bag suspended from the arms 122 is filled from a suitable scale device (not shown) through a hopper 170 located between the arms 122. The hopper 170 is connected by a member 171 to sleeves 172 slidably mounted upon the rods 108, the whole being supported by links 173 from levers 174 keyed to a shaft 175 journaled in bearings 176 mounted upon the rods 108. A lever 177 also keyed to the shaft 175 has a slot 178 for adjustably and pivotally connecting the lever 177 to a cam rod 179 which is vertically reciprocated by a cam 180 on the shaft 92. The hopper 170 is provided with a spout 181 having an elongated V-shaped open end provided with guides 182 and a narrow end member 183 for facilitating introduction of the spout into the mouth of a bag suspended from the arms 122.

At the start of the cycle of operations, that is to say, at the time the empty bag is inserted into the machine, the lower edge of the spout 181 lies a little below the upper edge of the normal position of the bag mouth, and penetrates into the mouth of the bag sufficiently to facilitate further entry at a later time.

In each revolution of the shaft 92, the cam 180 causes the spout 181 to descend further into the mouth of the bag a sufficient distance to bring the opening at the lower end of the spout 181 completely within the mouth of the bag, where it remains for a sufficient time to permit the desired amount of material to flow into the bag. Further rotation of the shaft 92 then causes the spout 181 to rise above the level of the top of the bag, clearing the bag and permitting the bag to be moved away laterally. In the last portion of the cycle of rotation of the shaft 92, the spout 181 is returned to its original position somewhat below its uppermost position in the cycle.

The scale device may be of any suitable type, and means may readily be provided for automatically tripping the scale device to discharge material through the hopper 170 as soon as the spout 181 has descended a sufficient distance into the mouth of the bag.

It is desirable to have the bag mouth straight and taut at the time it is delivered to the chains 80 of the conveyor C, but provision must be made for opening the mouth of the bag sufficiently to permit insertion of the spout 181.

For this purpose, I provide a cam 190 on the shaft 92, which acts through an arm 191 and a lever 192 to turn a shaft 193, the ends of which are supported in horizontally tapered slots 194 in lugs 195 on the arms 122. The inner ends of the lugs 195 are provided with raised portions 196 and are normally opposed by similar raised portions 197 on the inner ends of collars 198 keyed to the shaft 193.

As the shaft 92 rotates, however, the cam 190 causes the collars 198 to turn into the position shown in Fig. 6, bringing the ends of the arms 122 together a sufficient distance to permit insertion of the spout 181 into the mouth of the bag suspended from the arms 122. After the bag has been filled and when the spout 181 rises clear of the bag, the cam 190 turns the collars 198 back into a position where the raised surfaces of the collars 198 oppose those of the lugs 195, thus forcing the arms 122 farther apart and tightening and closing the mouth of the bag suspended therefrom.

The outward position of one of the arms 122 is shown in broken lines in Fig. 6. It will be understood that the other arm 122 is similarly moved by the cam 190.

*Operating sequence of bag-filling mechanism and intermittent feeding conveyor*

1. Prior to the introduction of a bag into the machine, the chains 80 are stationary and in their open position, as shown in Fig. 4. The chains 60, of course, move continuously, but due to the fact that the clutch 90 is disengaged, the chains 80 do not move at this time. The gripping levers 125 are raised, the switches 137 being now open and the solenoids 131 and the solenoid 140 being deenergized. The lever 141 obstructs the dog 142 of the clutch 93 and the shaft 92 is therefore stationary. The spout 181 is in its initial position, a little below its uppermost position in the cycle, as described above, and the arms 122 are in their farthest separated positions.

2. The operator introduces the preferably gusseted ends of the mouth of an empty bag into the mouths 123 of the arms 122, raising the feelers 135 and closing the switches 137, thus energizing the solenoids 131 and permitting the levers 125 to drop and grip the ends of the mouth of the bag. At the same time, the solenoid 140 is energized, drawing the lever 141 out of the path of the dog 142 and starting the shaft 92. In thus introducing the bag, the operator can without difficulty open the upper edge of the bag mouth enough to bring the tip of the spout 181 slightly into the mouth of the bag.

3. As the shaft 92 rotates, the cam 180 lowers the hopper 170 and the spout 181 descends until the open end of the same lies completely within the mouth of the bag. At the same time, the cam 190 causes the arms 122 to move inwardly, opening the bag to accommodate the spout 181.

4. The spout 181 being fully inserted in the mouth of the bag, the operator, or suitable automatic mechanism which may be provided for this purpose, releases the trip lever of the scale mechanism (not shown) and discharges a predetermined amount of material through the hopper 170 and the spout 181 into the bag.

5. When the bag is full, further rotation of the shaft 92, through the cams 180 and 190, causes the spout 181 to rise clear of the bag and the arms 122 to move outward.

6. During the first one-half revolution of the shaft 92, the clutch 118 has been disengaged, the cam 110 being stationary. When the shaft 92 reaches the end of its first one-half revolution, the cam 110 starts to turn, acting through the lever 107 to swing the chains 80 inwardly until they meet and grip the bag mouth, and retaining them in this position for a time.

7. The shaft 92 then acts through the cam 160 and the rod 161 to raise the levers 125, releasing the bag mouth which is now gripped between the chains 80. At the same time, the solenoids 131 are deenergized, permitting the latches 130 to retain the arms 125 in their upper positions, and the solenoid 140 is also deenergized, permitting the lever 141 to return under the influence of the spring 149 to the full line position of Fig. 21, where it awaits the dog 142 of the clutch 93.

8. Further rotation of the shaft 92 acts through the cam 91 and the arm 94 to engage the clutch 90, driving the chains 80 in synchronism with the chains 60 and moving the filled bag into the conveyor C.

9. When the entire mouth of the bag has entered the grip of the chains 60, the cam 91 disengages the clutch 90, stopping the chains 80, and at about the same time the cam 110 causes the chains 80 to return to their outward or separated position, as shown in Fig. 4, while the spout 181, which has remained stationary in its uppermost position after being lifted to clear the filled bag, descends a short distance to its initial position.

10. As soon as the chains 80 return to the position of Fig. 4, the dog 142 engages the end of the lever 141 and the shaft 92 stops, having completed one revolution. The cam 110 has also completed one revolution, and will not start again until the shaft 92 has been restarted and has completed one-half revolution.

The bag has now entered the conveyor C and approaches the sewing machine D.

Sewing machine and shear for stitching

As the bag moves forward along the conveyor C, the mouth of the bag is sewed by a sewing head 200, preferably of the type set forth and claimed in the patent issued to Robert N. Cundall, No. 1,963,652, dated June 19, 1934, and pivotally mounted in the manner set forth in the aforesaid copending application of Robert N. Cundall, Serial No. 640,758, filed November 2, 1932.

While, in the latter application, the sewing head was mounted upon a carriage which was caused to traverse the mouth of a stationary bag, whereas in the present instance the sewing head 200 is pivotally mounted upon a stationary bracket 201 and is traversed by the moving bag, the advantages of the pivotal mounting, which allows the throat portion 202 of the sewing head 200 to move with the bag as each stitch is made and to return to position for another stitch, are equally desirable in the present instance.

The sewing head 200 is provided with a supporting arm 203, the upper and outer end of which is fastened to one end of a horizontal cantilever shaft 204 journaled in a sleeve 205 forming a part of the bracket 201, which is attached to one of the angles 56. The shaft 204 is in axial alignment with the drive shaft 206 of the sewing head 200, which is preferably located as close to a central axis of gravity of the sewing head 200 as possible.

Additional lateral support for the sewing head 200 is provided in a roller 207, mounted on bracket members 208 and 209 attached to the bracket 201, and bearing laterally against the lower and outer edge of the arm 203. The arm 203 also carries an extension 211 having a set screw 212 adapted to bear against the member 208 when the sewing head 200 is in a vertical position, and an extension 213 having a set screw 214 adapted to engage the opposite side of the member 208 to limit the forward travel of the lower part of the sewing head 200. A spring 215 is provided for biasing the sewing head 200 toward a vertical position.

The drive shaft 206 of the sewing head 200 carries a spur gear 230 adapted to mesh with a gear 231 mounted on a shaft 232 journaled in a lug 233 forming a part of the support 201 and carrying a bevel gear 234 which meshes with another bevel gear 235 mounted on a high speed shaft 236 and driven by the shaft 236 through a clutch 237. The shaft 236 is journaled near one end in a bearing 238 forming a part of the bracket 201 and at the other end in a bearing 239 shown in Fig. 2 and is driven from the motor shaft 32 by means of a sprocket chain 240.

Freely mounted on the end of the shaft 236 and held at a fixed distance from the bracket 201 by a head 241 on the end of the shaft 236 is a bell-crank 242, carrying a beveled pin 243, and the outer end of one arm of which is connected by a rod 244 to a solenoid 245. Also freely mounted upon the shaft 236 is a lever 246 carrying a beveled pin 247 adapted to engage the pin 243, and the free end of which is connected by a rod 248 to one of the angles 56. Normally, that is to say, when the solenoid 245 is not energized, the pins 243 and 247, the bell-crank 242 and the lever 246 occupy the relative positions shown in Fig. 11.

When the solenoid 245 is engaged, however, the resultant movement of the crank 242 causes the pins 243 and 247 to engage, forcing the lever 246 toward the gear 235 and engaging the clutch 237, thus causing the gear 235 to rotate with the shaft 236 and driving the sewing machine 200. The means by which the bags moving along the conveyor C are caused to energize the solenoid 245 will be described hereinbelow in connection with the shearing mechanism for the stitching.

As each bag leaves the sewing machine 200 it is followed by a chain of stitching connecting it to the sewing machine 200, and it may be, to the next following bag. The purpose of the shear E is to sever this chain of stitching a short distance back of the rear end of the bag mouth.

Pivotally mounted by means of a vertical pin 260 upon a bracket 261 attached to one of the angles 56 is a member 262 having a sleeve 263 in which is journaled a shaft 264 having a pulley 265 at one end and a circular shear blade 266 at the other. The shaft 264 is driven from a pulley 267 on the high-speed shaft 236 by means of a belt 268 passing over the pulley 265 and over an idler pulley 269 mounted on one end of a lever 270 pivotally connected at 271 to the bracket 261. The other end of the lever 270 is biased downward by means of a tension spring 272, one end of which is fastened to a pin 273 set in the bracket 261.

The member 262 is connected by means of a fastener 275 to one end of a tension spring 276, the other end of which is fastened to an upright 277 mounted on the angle 56 opposite to that upon which the bracekt 261 is mounted. The spring 276 biases the member toward the position shown in full lines in Fig. 14, in which position it engages a stop 278 on the end of the bracket 261.

Attached to the member 262 is a more or less U-shaped bar 280 having an adjusting sleeve 281 and carrying at its lower end a head 282 which is so positioned as to be engaged by the free end of a bent feeler rod 283, the rear end of which is pivotally mounted on a bracket 284 secured to one of the angles 56 and the forward end of which lies across the path of the upper end of the bags passing along the conveyor C.

The construction is such that, as a bag approaches the sewing machine 200, it strikes the feeler rod 283, which moves out of the path of the bag, and, through engagement with the head 282 of the bar 280, also swings the member 262 against the pull of the spring 276 into the broken line position of Fig. 14, in which the shear blade 266 lies on one side of the path of the mouth of the bag emerging from the sewing machine 200.

As the sewed bag moves forward, the rear end of the bag at length passes the end of the feeler rod 283. The spring 276 then returns the member 262 to the full-line position of Fig. 14, the rotating shear blade 266 traversing and severing the chain of stitches a short distance behind the rear end of the bag mouth as it returns.

Pivotally mounted at 284 upon a bracket 285 secured to one of the angles 56 is a lever 286. One end of the lever 286 carries a normally open mercury switch 287, while the other end carries an adjustable U-shaped bar 288 and is flexibly biased toward a stop 289 by means of a tension spring 290.

The vertical portion of the bar 280 carries a plate 291 adapted to engage the bar 288, raising the upper end of the lever 286 and tilting and closing the mercury switch 287, when a bag strikes and moves the feeler arm 283.

The mercury switch 287 controls the energization of the solenoid 245, which in turn controls the engagement of the clutch 237. Thus, when a bag strikes the feeler arm 283, which it does as it approaches the sewing machine 200, the solenoid 245 is energized, and the sewing machine 200 operates, stitching the mouth of the bag. The sewing machine 200 continues to operate until the rear end of the bag passes the free end of the feeler bar 283, when the switch 287 opens, the solenoid 245 is deenergized, and the clutch 237 is disengaged, this taking place just at the time the shear blade 266 severs the chain of stitches following the bag.

The mouth of the bag having been sewed and the chain of stitching severed, the bag moves forward to the tape-applying device F.

*Tape-applying mechanism*

After the bag passes the shear E and progresses forward along the conveyor C, the mouth of the bag being in the grip of the chains 60, it encounters a tape-applying mechanism F which comprises principally a pair of driven rollers 300 and 300' located opposite each other at a point just below the top of the bag.

The roller 300 is keyed to a short vertical shaft 301 journaled in a lug 302 having a side extension 303 rigidly fastened by means of suitable fastening devices 305 to the rear face 307 of a supporting bridge 308 and carrying a spur gear 310. The roller 300' is keyed to a vertical shaft 301' journaled in a lug 302' having a side extension 303' provided with slots 304' and slidably held against the rear face 307 of the bridge 308 by means of fasteners 305' extending through the slots 304.

As will be observed from inspection of Fig. 18, the adjacent surface 307 of the bridge support 308 is provided with a groove 311 adapted to receive and guide the extension 303'. At one outer end of the groove 311 there is provided a lug 312 carrying an adjustable member 313. A compression spring 314 is located between the outer end of the extension 303' and the member 313 and serves to force the lug 302' toward the lug 302. The rollers 300 and 300' are, however, prevented from actually meeting under the influence of the spring 314 by means of an adjustable stop comprising a set screw 315, the purpose of which will be made clear hereinbelow.

The shaft 301 carries a spur gear 310' which means with the gear 310 and also carries a sprocket 316 driven by a chain 317, as will be explained hereinbelow, at such speed that the peripheral speed of the rollers 300, 300' corresponds to the linear speed of the chains 60.

Tape is applied to the mouth of the bag approaching the rollers 300, 300' by means of a tapered guide 320, the forward end of which is located immediately behind the rollers 300, 300' and is relatively narrow and deep as shown in Fig. 22, whereas the rear end of the guide 320 is relatively shallow and wide. The guide 320 serves to receive flat tape from a roller 321 and to fold the sides of the tape over the sewed mouth of the bag just prior to the point at which the mouth of the bag traverses the rollers 300, 300'.

The forward end of the guide 320 is conveniently supported by means of a threaded supporting member 322 carrying an adjusting nut 323 and passing through a slot 324 in the rear of the bridge support 308. A compression spring 325 is also provided to assist in maintaining the guide 320 in position. The rear end of the guide 320 is suitably supported by means of a threaded member 326, a nut 327 and a spring 328 from a supporting arm 329 extending laterally from a collar 330 mounted on a vertical supporting rod 331 which carries a roll 332 of tape.

The tape web 333 passes from the roll 332 around a roller 334, and over a glue-applying roller 335, a portion of which is immersed in a bath 336 of glue or other adhesive material carried in a trough 337 mounted upon a standard 338. The web 333 then passes under the roller 321, its under surface having been coated with adhesive material transferred to it from the bath 336 by the roller 335 and into the guide 320. As the web 333 passes through the guide 320 the outer sides of the web 333 are folded downwardly over the sewed mouth of the bag. As shown in Fig. 18, the guide 320 may be arranged, by suitable adjustment of the nuts 323 and 327, in a position inclined to the path of the bags passing therethrough. The end of the guide 320 to which the tape is introduced may be located above the level of the upper edges of the bag mouths while the opposite end may be positioned to press the tape down upon the upper edges of the bag mouths as they are progressed through the guide 320.

It will be observed that the outer surface of the rollers 300, 300' are knurled or otherwise roughened. The setting of the stop 315 is such that the rollers 300 and 300' are separated even at their closest point of approach to each other by a space greater than the thickness of the folded tape, so that the rotating surfaces of the rollers 300 and 300', acting upon the tape alone in the absence of a bag, do not cause tape to be drawn from the roll 332. The distance between the rollers 300 and 300' is such, however, that when the forward end of a bag passes through the guide 320 and enters the space between the rollers 300 and 300', the combined action of the moving bag and the rotating rollers 300, 300' draws tape off the roll 332 and over the rollers 334, 335 and 321 at the speed at which the bag progresses, thus taping the mouth of the bag.

The construction is such, as will be obvious from the above, that the rollers 300 and 300' exert a yielding but firm pressure upon the outer sides of the tape surrounding the mouth of the bag, thus applying the tape to the bag mouth in an efficient manner.

Where a so-called "snake-stitch" or other reinforcing for the stitching of the bag mouth has been provided by the sewing machine 200, as explained in the aforesaid patent to Robert N. Cundall, No. 1,963,652, or otherwise, the rollers 300, 300' may, as shown, be provided as shown with grooves 340 so located as to accommodate the stitching and reinforcement of the same which has been applied to the mouth of the bag and to prevent the pressure of the rollers 300, 300' from being harmfully exerted upon the same.

The roller 335 may be provided, as shown, with a scraper 341 adjustably mounted by means of a screw 342 and a spring 343 above the trough 337 in such manner as to control the amount of glue or other adhesive which adheres to the roll 335 and is transferred in part to the tape web 333.

Tape-shearing mechanism

As the rear end of the mouth of the bag leaves the rollers 300 and 300' and moves forward in the grip of the chains 60, it would continue to be followed indefinitely by tape from the roller 332 unless means were provided for severing this following tape. Such means comprises the shear E' which may be substantially identical with the shear E previously described, except that in this instance it performs no other function than to sever the tape at a point just behind the rear end of the moving bag.

The shear E' comprises a member 350 pivotally mounted by means of a vertical pin 351 on a bracket 352 attached to one of the main angles 56 and carries a rotating shear blade 353 and a pulley 354 which are driven by means of a belt 355 from a pulley 367' on the shaft 236. An idler pulley 356 is provided which is mounted similarly to the idler pulley 269 of the shear E.

The member 350 is normally biased against a stop 357 on the bracket 352 by means of a spring 358 extending from the member 350 to a vertical rod 359 secured to one of the angles 56. In this position, the shear blade 353 lies across the path of the mouth of the bag and the following tape. The blade 353 is, however, moved out of the path of an approaching bag by means of a feeler bar 360 similar to the feeler bar 283 of the shear E and mounted on a bracket 361 secured to one of the angles 56. When the mouth of a bag strikes the feeler bar 360 the latter moves out of the path of the bag, forcing the head 362 of a rod 363 attached to the member 350 to one side against the action of the spring 358 and into such position that the blade 353 is withdrawn from the path of the bag.

When the rear end of the bag passes the free end of the feeler bar 360 the spring 358 again returns the member 350 to engagement with the stop 357 and causes the rotating shear blade 353 to traverse and sever the tape following the bag at a short distance behind the rear end of the mouth of the bag. As has been explained hereinabove, the mounting of the rollers 300, 300' is such that as soon as the shear blade 353 severs the tape, withdrawal of tape from the roll 332 is interrupted until such time as another bag enters the tape-applying mechanism F.

Tape-squeezing mechanism

In order to insure firm adhesion of the tape to the sewed mouth of the bag, the latter is next caused to traverse the tape-squeezing mechanism G. This mechanism comprises in part a pair of grooved rollers 380 keyed to vertical shafts 381 mounted on bearings 382 forming part of a bracket 383 secured to one of the angles 56. The shafts 381 are provided with sprockets 384 driven by means of a chain 385 from a sprocket 386 located on one of the vertical shafts 63 which serve to drive the chains 60.

The bracket 383 is provided with an extension 387 located between the bearings 382 on the shaft 381 and carrying a vertical shaft 388 upon which are mounted supporting arms 389 carrying sleeves 391 located opposite the bearings 382. Within the sleeves 391 are journaled vertical shafts 392 upon which are mounted grooved rollers 393 located opposite to the rollers 380.

The bearings 382 and the sleeves 391 are provided with lugs 394 and 395, respectively, through each set of which passes a rod 396 carrying a compression spring 397 located between the lug 395 and the head 398 of the rod 396.

The springs 397 act upon the lugs 395, forcing the rollers 393 firmly against the rollers 380 which oppose them. As the points of engagement of the rollers 380 and the rollers 393 are located directly above the line of travel of the mouth of the bag, the taped portion of the bag mouth lying above the chains 60 traverses the rollers 380 and 393 and is subjected to the considerable pressure exerted by the springs 397 which insures that the tape is firmly applied to the mouth of the bag.

The rollers 393 are driven by means of gears 399 mounted on the shafts 392 and adapted to mesh with gears 400 mounted on the shafts 381. The teeth of the gears 399 and 400 are cut sufficiently deep to maintain these gears in mesh with each other even when the shafts 392 are laterally displaced a short distance by the passage of a bag mouth between the rollers 380 and 393.

Upon the rear shaft 392 there is keyed a sprocket 402 which is in engagement with the sprocket chain 317 which drives the rollers 300, 300'.

The arrangement of the drive is such that the peripheral speed of the rollers 380 and 393 corresponds exactly to the linear travel of the mouth of the bag lying in the grip of the chains 60.

The bag having been filled and sewed, the stitching and tape following the bag having been severed, and pressure having been applied to the mouth of the bag to insure adherence of the tape thereto, the bag is now ready to be delivered out of the machine and passes forward to that portion of the conveyor C lying forward of the belts 50, where it is removed by an operator.

It will be understood by those skilled in the art that, while my invention has been described and set forth hereinabove by way of exemplification, with reference to a particular embodiment thereof, my invention is not limited to the specific details of such embodiment or exemplification, but may variously be embodied within the scope of the claims hereinafter made.

We claim:

1. In a machine for closing open-mouth bags, a conveyor adapted to advance a series of spaced bags and having means for gripping said bags a short distance below the upper edges of the same, a source of adhesive tape, a folder adapted to guide tape drawn from said source over the upper edges of a bag held by said gripping means, a pair of rollers located on either side of the upper edges of a bag leaving said folder, said rollers being biased toward each other, and an abutment for establishing a minimum distance between said rollers greater than the thickness of the folded tape alone and less than the thickness of the taped bag mouths.

2. In a machine for closing open-mouth bags and applying tape to the closures thereof, in combination, a pair of opposed endless belts adapted to grip the mouth of a bag at a point below the upper edges thereof, said belts being adapted to progress a series of spaced bags, a pair of rollers located above said belts adjacent the path of the upper edges of the mouths of bags gripped by said belts, said rollers being spaced apart by a distance substantially greater than two thicknesses of tape but not so great as to prevent said rollers from exerting a compressive force upon the taped bag mouths passing therebetween, and a guide for feeding adhesive tape to the upper edges of said bags, said guide being located immediately in advance of said rollers.

3. Means to seal the mouth of a bag which has been closed in a single plane, comprising an adhesive applier adapted to apply adhesive to one side of a strip of flexible material, guides around which said strip passes from said adhesive applier to a point adjacent the upper edge of the closed bag mouth, a member through which the strip passes adapted to bend the strip of material into inverted V-shape with the adhesive side adjacent the bag mouth, said member being positioned with respect to the upper edge of the bag mouth to be vertically spaced therefrom at the end at which the tape enters and substantially in engagement therewith at the opposite end so that upon relative movement of the bag mouth through said member the tape will be brought into adhering engagement over the mouth of the bag with the sides of the V in contact with the sides of the bag mouth, and rolls thereafter engaging the mouth of the bag to press the tape into firm adherence and draw the tape through the preceding means.

4. In a filled bag closing machine wherein a bag is closed by a sewing machine applying a line of stitches to its open end, means to apply adhesive to a strip of flexible material, means to fold the gummed strip over the end of the bag to cover the stitches, means to press the strip against the sides of the bag comprising successive sets of opposed rolls, one roll of each set being resiliently urged toward the opposed roll of that set, and means to prevent the rolls of the first of said sets from contacting each other.

5. In a filled bag closing machine wherein a bag is closed by a sewing machine applying a line of stitches to its open end, means to fold a strip of adhesive tape over the closed end of a bag, a continuous source of supply of said tape, means to press the tape onto the sides of the bag comprising successive sets of opposed rolls, and means to clip the tape to separate the bag from the source of supply, said clipping means being located between adjacent sets of said rolls.

6. In a closing machine, compression means comprising juxtaposed rolls, means resiliently pressing said rolls together, means for supplying a folded strip to said rolls with bag mouths within the fold of the strip, means for driving said rolls so that juxtaposed surfaces against said strip move in the same direction at substantially the same velocity and means for separating the rolls against the force resiliently holding them together.

7. In a bag closing machine, compressing means comprising a pair of adjacently located movable members, means for driving said members so that adjacent surfaces move in the same direction at substantially the same velocity, means for delivering between said members a strip folded over open bag mouths, means for resiliently forcing said members together to press said strip against the bag mouths, means for adjusting the resilient forcing means, and means for overcoming said force and separating said members to release the pressure on said strip.

8. In a bag closing machine, compressing means comprising a pair of adjacently located movable members, means for driving said members so that adjacent surfaces move in the same direction at substantially the same velocity, means for delivering between said members a strip folded over open bag mouths, means for resiliently forcing said members together to press said strip against the bag mouths, means for adjusting the resilient forcing means, means for overcoming said force and separating said members to release the pressure on said strip, means for applying adhesive to said strip before it reaches said folding means, and tensioning means therefor.

LUTA L. CUNDALL,
*Administratrix of the Estate of Robert N. Cundall, Deceased.*
LINCOLN A. CUNDALL.